J. C. ARMOR.
VOLTAGE REGULATION.
APPLICATION FILED MAY 26, 1920.

1,414,248.

Patented Apr. 25, 1922.

Inventor:
James C. Armor,
by *Albert G. Davis*
His Attorney.

UNITED STATES PATENT OFFICE.

JAMES C. ARMOR, OF PITTSBURGH, PENNSYLVANIA, ASSIGNOR TO GENERAL ELECTRIC COMPANY, A CORPORATION OF NEW YORK.

VOLTAGE REGULATION.

1,414,248.   Specification of Letters Patent.   Patented Apr. 25, 1922.

Application filed May 26, 1920. Serial No. 384,302.

*To all whom it may concern:*

Be it known that I, JAMES C. ARMOR, citizen of the United States, residing at Pittsburgh, in the county of Allegheny, State of Pennsylvania, have invented new and useful Improvements in Voltage Regulations, of which the following is a specification.

My invention relates to a system of voltage regulation and is particularly applicable to a system for maintaining a constant voltage on a circuit which is connected in parallel with another circuit in which the load and power factor fluctuate over wide ranges.

An object of my invention is to provide means for maintaining the potential on a circuit constant regardless of fluctuations in the load and power factor in another circuit connected in parallel therewith.

One feature of my invention consists in connecting the primary winding of a series transformer in series with the circuit in which the current and power factor fluctuate over wide ranges, in connecting the secondary winding in series with the circuit upon which a constant voltage is maintained, and in providing suitable magnetic material in the magnetic circuit of the transformer, so arranged that the voltage induced in the secondary winding by the current in the primary winding balances the impedance drop in the supply line caused by the current flowing through the primary winding, irrespective of the power factor and the magnitude of said current.

Another feature of my invention consists in a novel construction of the series transformer, whereby the magnitude of the voltage induced in the secondary winding and the phase relation between the voltage induced in the secondary winding and the current in the primary winding may be accurately adjusted in a simple manner.

My invention will be better understood from the following description taken in connection with the accompanying drawings and its scope will be pointed out in the appended claims.

Figure 1:
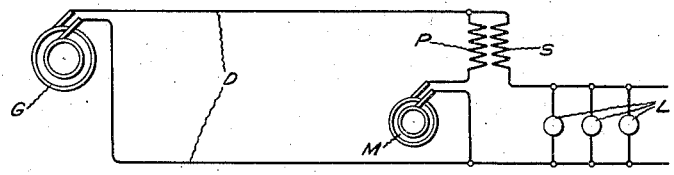
Figure 2:
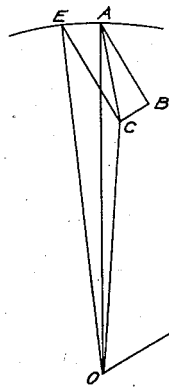
Figure 3:
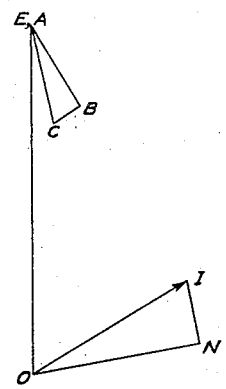
Figure 4:
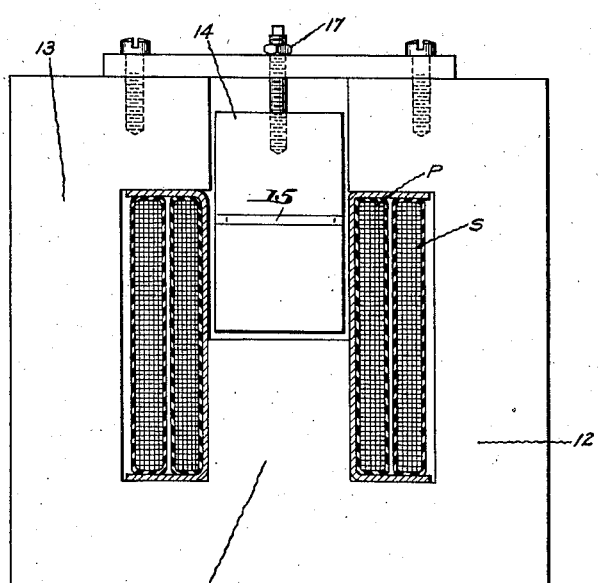
Figure 5:
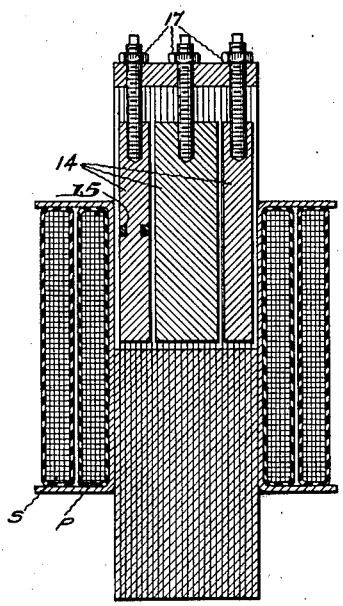

Referring to the drawings, Fig. 1 diagrammatically illustrates the connections of a system embodying my invention; Figs. 2 and 3 are explanatory diagrams; Fig. 4 is a front sectional view of a transformer constructed in accordance with my invention, and Fig. 5 is a side sectional view of the transformer shown in Fig. 4.

Referring to Fig. 1 G represents a source of current supplying a distribution circuit D. P and S represent the primary and secondary windings of an ordinary series transformer, these windings being wound in opposite directions upon a core not shown. The winding P is connected in series with a circuit from which variable loads at different power factors are supplied. I have indicated such a circuit as being one which supplies current to a motor M. The winding S of the transformer is inserted in a circuit connected in shunt to the motor circuit and from which a load requiring substantially constant voltage is energized. I have indicated such a circuit as being one which supplies a bank of lamps L.

If the transformer is of the usual type which has very little core loss the voltage and current relations of the arrangement shown in Fig. 1, are shown in Fig. 2. In this figure OA represents the lamp voltage of Fig. 1 when the motor circuit is open. When the motor M is connected to the distribution circuit D a current of low power factor flows through the winding P of the transformer. OI represents such a current. This current produces an impedance drop AC in the distribution circuit which is made up of a reactance drop AB and a resistance drop BC, and if it were not for the voltage that is induced in the winding S, the lamp voltage would become OC. Current OI, however, induces a voltage in the winding S which is parallel and opposite to the reactance drop AB and falls somewhere along the line CE. It is apparent that by adjusting the turn ratio or the air gap of the transformer the induced voltage CE can be made the proper length to make the lamp voltage OE equal to OA.

Since both the line drop AC and the induced voltage CE are directly proportional to the current through the winding P, an ordinary series transformer, when connected in the manner shown in Fig. 1, gives perfect compensation regardless of the magnitude of the current through the winding P provided the power factor remains constant. If, however, the power factor of the current improves, the current OI moves counter-clockwise around O and the voltage diagram ABCE moves counter-clockwise around A. This throws the point E within the circle having the radius OA, so that the lamp voltage OE is less than normal. If the power factor decreases, the rotation is clockwise and the point E falls outside of the circle and, therefore, the lamp voltage is higher than normal. It is evident, therefore, that if an ordinary series transformer is used, the transformer under-compensates for power factors above and over-compensates for power factors below that voltage at which it has been adjusted.

It will be evident that if the induced voltage CE is made to coincide and to be equal in magnitude with the impedance drop AC of the distribution circuit compensation is perfect at all loads and power factors. This necessitates that the induced voltage CE be shifted out of quadrature with the load current in the primary winding; in other words, that the load current be made to have a power and a watt-less component in the transformer of such a ratio as to make the induced voltage CE coincide with the impedance drop CA.

Referring to Fig. 3, the motor current OI is shown as having a power component IN and a watt-less component ON. The power component IN is of such a value that the induced voltage CE which is perpendicular to the watt-less component ON, coincides with the impedance drop CA of the distribution circuit. Therefore, since CE is made equal to CA the lamp voltage OE will be equal to OA at all loads and power factors as the triangles ABC and ONI are similar triangles.

I find that by constructing the transformer so that it has a certain amount of core loss, the value of which depends upon the impedance drop in the distribution circuit, I can obtain the desired phase relation between the current in the primary winding P and the voltage induced in the secondary winding S.

One suitable transformer construction, whereby I can easily obtain the desired phase relation, is shown in Figs. 4 and 5. In these figures I have shown a shell type transformer 10 with an air gap between the middle leg 11 of the core and the two outer legs 12 and 13. Preferably, the core is made up of ordinary stampings, so as to have a very low core loss. A plurality of members 14 of magnetic material are connected in parallel in the air gap and so arranged that the length of the air gap between each member and the leg 11 of the core can be independently varied without varying the length of the air gap between the member and the legs 12 and 13. One such arrangement is clearly shown in the drawing, whereby the position of each member in the air gap can be varied by merely turning a nut 17 associated therewith.

I design one or more of the members 14 to give a high core loss and design the remainder of the members 14 to give a low core loss. I have found that a member made of a solid piece of cold rolled steel gives a high core loss and is very satisfactory for this purpose. I have also found that a member of any magnetic material may be used and the core loss thereof varied by means of a short circuited turn 15 of conducting material around the member. The other members 14, which are designed to give a low core loss, are preferably made up of stampings of ordinary transformer steel.

By varying the length of the air gap between a member 14 and the leg 11 of the core, the reluctance of the magnetic circuit through the member is changed relative to the reluctances of the magnetic circuits through the other members 14. Consequently, the amount of flux in the member which is adjusted is also changed relative to the amount of flux in the other members. Therefore, it will be evident that, by properly varying the relative amounts of flux in the different members and the total flux of the transformer by adjusting the air gaps between the leg 11 of the core and the members 14, the core loss of the transformer can be so adjusted that the load current in the primary winding has a power component in the transformer of such a value that, at all loads and power factors, the voltage induced in the secondary winding is equal in magnitude and opposite in phase to the impedance drop in the distribution circuit caused by the primary load circuit.

While I have shown only one construction of a transformer, whereby I am able to adjust, in a simple manner, the phase and magnitude of the voltage induced in the secondary winding, it will be understood that this construction is merely illustrative of the present invention, and that many modifications thereof may be made without departing from the spirit and scope of my invention, and I aim to cover, in the appended claims, all such modifications.

What I claim as new and desire to secure by Letters Patent of United States, is:—

1. In combination, a source of current, a distribution circuit supplied by said source, a load circuit requiring substantially constant voltage connected to said distribution circuit, a second load circuit connected in parallel to said first load circuit and from which variable loads having variable power factors are energized, and a transformer having a winding in series with said first mentioned load circuit, another winding in series with said second mentioned load circuit, and members of magnetic material giving different core losses so arranged in its magnetic circuit that the voltage induced in the first mentioned winding by the load current flowing in said second load circuit balances the impedance drop produced in the distribution circuit by load current flowing in said second load circuit, irrespective of the power factor and magnitude of the load current.

2. In combination, two load circuits supplied in parallel from the same source of current, and a transformer having its primary and secondary windings included in series with said load circuits respectively, a plurality of members of magnetic material connected in parallel in the magnetic circuit of said transformer, one of said members being designed to give a high core loss, another of said members being designed to give a low core loss, and means for varying the amount of flux in each member relative to the amount of flux in the other of said members.

3. In combination, two load circuits supplied in parallel from the same source of current, and a transformer having its primary and secondary windings included in series with said load circuits respectively, members of magnetic material connected in parallel in the magnetic circuit of said transformer, one or more of said members being designed to give a high core loss, the remainder of said members being designed to give a low core loss, and means for varying the reluctance of the magnetic circuit through each of said members.

4. In combination, two load circuits supplied in parallel from the same source, and a transformer having its primary and secondary windings included in series with said load circuits respectively, an air gap in its magnetic circuit, and a plurality of members arranged to be adjusted to vary the length of said air gap, one or more of said members being designed to give a high core loss and the remainder of said members being designed to give a low core loss, and means for varying the position of said members in said air gap.

In witness whereof, I have hereunto set my hand this 21st day of May, 1920.

JAMES C. ARMOR.